United States Patent  
Kaitha (10) Patent No.: US 11,636,013 B2  
(45) Date of Patent: Apr. 25, 2023

(54) EVENT-DRIVEN SYSTEM FAILOVER AND FAILBACK

(71) Applicant: Capital One Services, LLC, McLean, VA (US)

(72) Inventor: Sunil Kaitha, Plano, TX (US)

(73) Assignee: Capital One Services, LLC, McLean, VA (US)

(*) Notice: Subject to any disclaimer, the term of this patent is extended or adjusted under 35 U.S.C. 154(b) by 52 days.

(21) Appl. No.: 17/447,671

(22) Filed: Sep. 14, 2021

(65) Prior Publication Data

US 2023/0083450 A1    Mar. 16, 2023

(51) Int. Cl.  
G06F 11/00  (2006.01)  
G06F 11/20  (2006.01)  
G06F 9/4401  (2018.01)

(52) U.S. Cl.  
CPC ........ G06F 11/2023 (2013.01); G06F 9/4403 (2013.01); G06F 11/2025 (2013.01); G06F 11/2028 (2013.01); G06F 11/2056 (2013.01); G06F 2201/85 (2013.01)

(58) Field of Classification Search  
CPC ............. G06F 11/2023; G06F 11/2025; G06F 11/2028; G06F 11/2043; G06F 11/2046; G06F 11/2056; G06F 2201/85  
See application file for complete search history.

(56) References Cited

U.S. PATENT DOCUMENTS 8,904,231 B2 * 12/2014 Coatney .............. G06F 11/2058  
714/4.11  
11,188,266 B2 * 11/2021 Kesavan ............. G06F 11/1417

FOREIGN PATENT DOCUMENTS

WO    WO-2008040067 A1 *  4/2008 .......... G06F 11/2023

* cited by examiner

*Primary Examiner* — Michael Maskulinski  
(74) *Attorney, Agent, or Firm* — Harrity & Harrity, LLP (57) ABSTRACT

A system determines that a primary event processor, included in a primary data center, is associated with a failure. The primary event processor is included in the primary data center and configured to process first events stored in a main event store of the primary data center. The system identifies a secondary event processor, in a secondary data center, that is to process one or more first events based on the failure. The primary event processor and the secondary event processor are configured to process a same type of event. The system causes, based on a configuration associated with the primary or secondary event processor, the one or more first events to be retrieved from one of the main event store or a replica event store. The replica event store is included in the secondary data center and mirrors the main event store of the primary data center.

20 Claims, 6 Drawing Sheets

EVENT-DRIVEN SYSTEM FAILOVER AND FAILBACK

BACKGROUND

In computing, failover is switching to a redundant computing system upon the failure of a previously active computer system. Failover can provide near-continuous availability and a high degree of reliability.

SUMMARY

In some implementations, a system for data center failover includes a first data center, a second data center, and one or more processors. The first data center includes a first main event store that stores a plurality of first events to be processed in the first data center, a first replica event store that is synchronized with a second main event store of a second data center, and a plurality of first event processors configured to process the plurality of first events stored in the first main event store. The second data center includes the second main event store, wherein the second main event store stores a plurality of second events to be processed in the second data center, and a plurality of second event processors configured to process the plurality of second events stored in the second main event store. The one or more processors may be configured to detect a failure of a second event processor of the plurality of second event processors; identify a first event processor, in the first data center, that is to process one or more second events of the plurality of second events based on detecting the failure of the second event processor; determine, based on a configuration associated with the first event processor or the second event processor, whether the first event processor is to process the one or more second events from the first replica event store or the second main event store; and cause retrieval of the one or more second events from one of the first replica event store or the second main event store, for processing by the first event processor, based on determining whether the first event processor is to process the one or more second events from the first replica event store or the second main event store.

In some implementations, a method for data center failover between a primary data center and a secondary data center includes determining, by a system associated with the secondary data center, that a primary event processor, included in the primary data center, is associated with a failure, wherein the primary event processor is one of a plurality of primary event processors included in the primary data center and configured to process a plurality of first events stored in a main event store of the primary data center; identifying, by the system, a secondary event processor, in the secondary data center, that is to process one or more first events of the plurality of first events based on the failure, wherein the primary event processor and the secondary event processor are configured to process a same type of event; and causing, by the system and based on a configuration associated with the primary event processor or the secondary event processor, the one or more first events to be retrieved from one of the main event store or a replica event store for processing by the secondary event processor, wherein the replica event store is included in the secondary data center and is configured to mirror the main event store included in the primary data center.

In some implementations, a device for managing data center failover between a primary data center and a secondary data center includes one or more memories, and one or more processors, communicatively coupled to the one or more memories, configured to determine that a primary event processor, of a plurality of primary event processors included in the primary data center, is associated with a failure, wherein the plurality of primary event processors are configured to process a plurality of first events stored in a first main event store of the primary data center; identify, based on the failure, a secondary event processor, of a plurality of secondary event processors included in the secondary data center, that is to process one or more first events of the plurality of first events, wherein the plurality of secondary event processors are configured to process a plurality of second events stored in a second main event store of the secondary data center; identify a configuration associated with the primary event processor or the secondary event processor; and transmit an instruction to cause retrieval of the one or more first events, for processing by the secondary event processor, from one of the first main event store or a replica event store based on the configuration, wherein the replica event store is included in the secondary data center and is configured to mirror the first main event store included in the primary data center.

DETAILED DESCRIPTION

The following detailed description of example implementations refers to the accompanying drawings. The same reference numbers in different drawings may identify the same or similar elements.

Data center resiliency is the ability of a data center (or data center components) to recover quickly and continue operating despite a disruption, such as an equipment failure or a power outage. Data center resilience is important to prevent or reduce interruptions to data processing, to provide continuous (or near-continuous) service availability, and to avoid data loss. Data center resiliency can be achieved in a variety of ways, and may depend on a system architecture of a data center or multiple data centers. Different techniques for providing data center resiliency may result in different outcomes in terms of service availability, data loss, or preventing data processing interruptions. Failover is one technique that can be used to switch from a failed data center to a backup data center.

Some techniques described herein provide data center resilience, and particularly resilience in an event-driven system, using event-driven system failover and failback techniques. These techniques may be applied to a data center architecture used for event processing, sometimes called an event-driven architecture. In an event-driven architecture, an event notification may be triggered based on occurrence of an event, which is a change in state of information relevant to an event processing system. The event notification may be produced, published, propagated, detected, and/or consumed in connection with the event processing system. Systems and methods described herein enable failover in an event processing system (e.g., having an event-driven architecture) to improve service availability, reduce delays associated with event processing, and/or prevent data loss.

Figure 1:
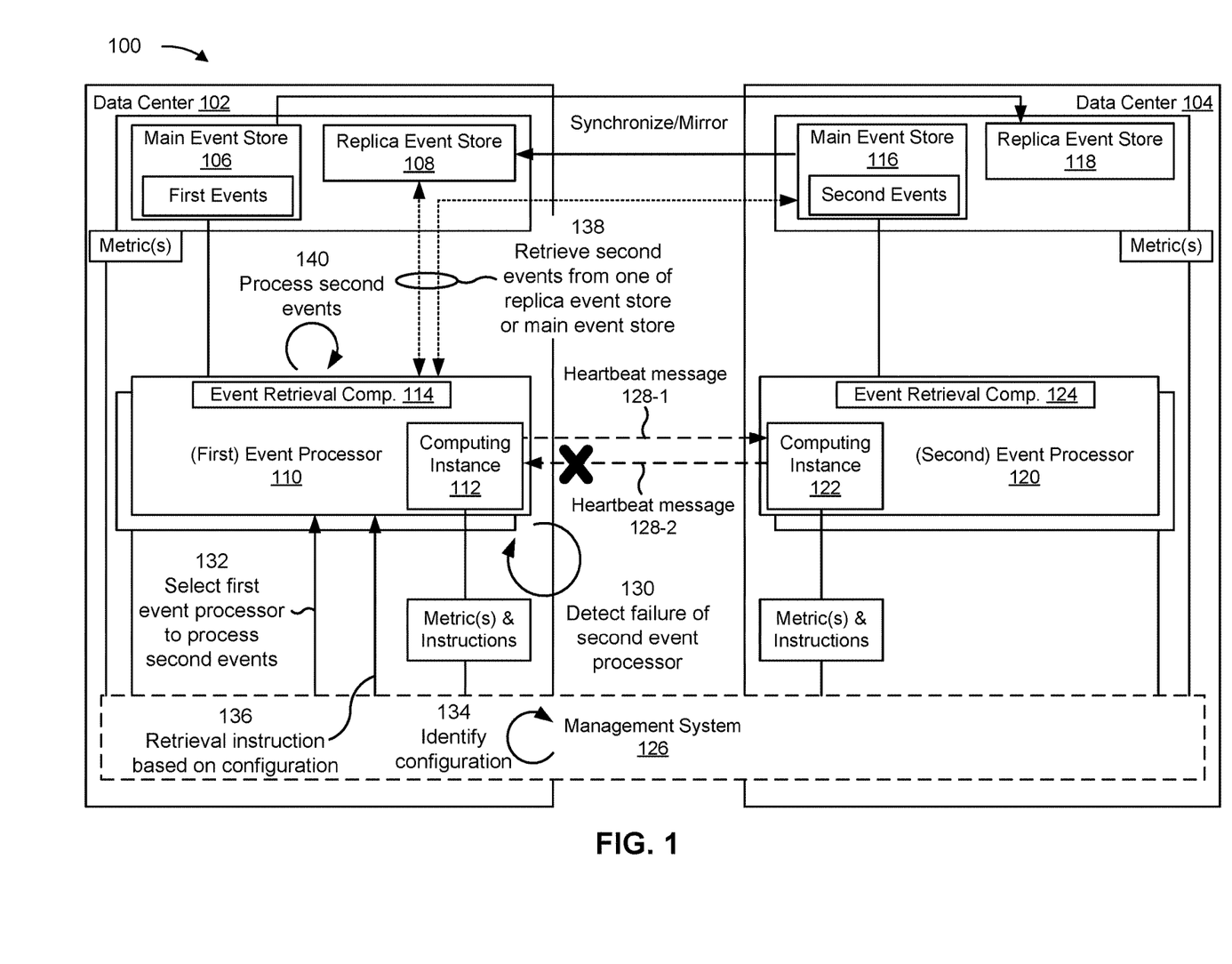
FIGS. 1-3 are diagrams of example systems relating to event-driven system failover and failback.

FIG. 1 is a diagram of an example system 100 associated with event-driven system failover and failback. As shown in FIG. 1, the example system 100 includes a first data center 102 (e.g., that includes a first event-driven system) and a second data center 104 (e.g., that includes a second event-driven system). In the example system 100, a failure occurs in the second data center 104 that triggers failover from the second data center 104 to the first data center 102 for event processing. In some implementations, the first data center 102 may be located in a first geographic region (and/or may be housed in a first building or a first group of buildings), and the second data center 104 may be located in a second (e.g., different or separate) geographic region (and/or may be housed in a second building or a second group of buildings).

As shown, the first data center 102 may include a main event store 106 (e.g., a main database), a replica event store 108 (e.g., a replica database), one or more event processors 110, a computing instance 112, and an event retrieval component 114. Because these components are part of the first data center 102, these components are sometimes referred to herein as a first main event store, a first replica event store, one or more first event processors, a first computing instance, and a first event retrieval component, respectively.

In some implementations, the second data center 104 may include a main event store 116 (e.g., a main database), a replica event store 118 (e.g., a replica database), one or more event processors 120, a computing instance 122, and an event retrieval component 124. Because these components are part of the second data center 104, these components are sometimes referred to herein as a second main event store, a second replica event store, one or more second event processors, a second computing instance, and a second event retrieval component, respectively.

In some cases, the data center that experiences a failure (e.g., the second data center 104 in the example system 100) may be called a "primary data center," and the data center that begins processing events that would otherwise be processed by the primary data center if the failure had not occurred (e.g., the first data center 102 in the example system 100) may be called a "secondary data center." Similarly, an event processor in the primary data center may be called a "primary event processor," and an event processor in the secondary data center may be called a "secondary event processor." Similarly, a main event store in the primary data center may be called a "primary main event store," and a main event store in the secondary data center may be called a "secondary main event store." Similarly, a replica event store in the primary data center may be called a "primary replica event store," and a replica event store in the secondary data center may be called a "secondary replica event store." Similarly, an event stored in the main event store of the primary data center may be called a "primary event," and an event stored in the main event store of the secondary data center may be called a "secondary event."

As further shown, the example system 100 may include a management system 126. The management system 126 may manage the first data center 102 and/or the second data center 104 to assist with providing data center resilience, such as by assisting with failover from a primary data center (e.g., the second data center 104 in the example system 100) to a secondary data center (e.g., the first data center 102 in the example system 100). The management system 126 may include one or more components that are part of the first data center 102 and one or more components that are part of the second data center 104. Additionally, or alternatively, the management system 126 may communicate with respective components of the first data center 102 and the second data center 104 via a network.

In the first data center 102, the main event store 106 may store first events to be processed in the first data center 102. As used herein in connection with the example implementations, the term "event" refers to information indicative of occurrence of an event and/or a state of an event, and may be used interchangeably with "event notification." In some implementations, the first events stored in the main event store 106 are processed only in the first data center 102 (and not any other data centers) unless the first data center 102 experiences a failure. Similarly, in the second data center 104, the main event store 116 may store second events to be processed in the second data center 104. In some implementations, the second events stored in the main event store 116 are processed only in the second data center 104 (and not any other data centers) unless the second data center 104 experiences a failure.

In some implementations, the main event store 106 and/or the main event store 116 are commit databases. In a commit database, after a record (e.g., an event) in the commit database is changed (e.g., processed), that change is permanently saved in the commit database and replaces the information that was previously stored in connection with the record. For example, if an event stored in a main event store has been processed (e.g., by an event processor), then the main event store may be updated with an indication that the event has been processed. This assists with synchronization of databases (e.g., event stores) across data centers and tracking of processed events to prevent duplicate processing and enable processing of unprocessed events in case of a failure, as described in more detail below.

In the first data center 102, the replica event store 108 may be synchronized with the main event store 116 of the second data center 104. In other words, the replica event store 108 of the first data center 102 may mirror the main event store 116 of the second data center 104. For example, the replica event store 108 and the main event store 116 may be synchronized using insert synchronization, update synchronization, drop synchronization, mixed synchronization, or any other database synchronization technique. Synchronization between the replica event store 108 and the main event store 116 may be an ongoing process where changes are updated automatically between the event stores to maintain consistency, such as by a message exchange when the main event store 116 is updated and/or a periodic message exchange. As a result, the replica event store 108 may store second events (e.g., received from the main event store 116) that are to be processed in the first data center 102 only if a failure occurs in the second data center 104.

Similarly, in the second data center 104, the replica event store 118 may be synchronized with the main event store 106 of the first data center 102. In other words, the replica event store 118 of the second data center 104 may mirror the main event store 106 of the first data center 102. For example, the replica event store 118 and the main event store 106 may be synchronized using insert synchronization, update synchronization, drop synchronization, mixed synchronization, or any other database synchronization technique. Synchronization between the replica event store 118 and the main event store 106 may be an ongoing process where changes are updated automatically between the event stores to maintain consistency, such as by a message exchange when the main event store 106 is updated and/or a periodic message exchange. As a result, the replica event store 118 may store first events (e.g., received from the main event store 106) that are to be processed in the second data center 104 only if a failure occurs in the first data center 102.

The first data center 102 may include multiple event processors 110. An event processor 110 may be configured to process first events stored in the main event store 106. In some implementations, an event processor 110 may be configured to process first events having a particular event type (e.g., which may be indicated and/or stored in connection with the event, such as in the main event store 106). For example, an event processor 110 may include software code and hardware on which the software code executes. The software code may include instructions for processing an event of a particular event type. One event processor 110 may process events having a first event type, another event processor 110 may process events having a second event type, and so on.

In some implementations, each event processor 110 includes or is associated with a computing instance 112. The computing instance 112 may be used by an event processor 110 to transmit heartbeat messages 128-1 to the second data center 104. Additionally, or alternatively, the computing instance 112 may be used by the event processor 110 to receive and/or process heartbeat messages 128-2 from the second data center 104. In some implementations, a computing instance 112 of an event processor 110 may transmit heartbeat messages 128-1 to a corresponding computing instance 122 of a corresponding event processor 120 in the second data center 104 (e.g., an event processor 120 that processes the same type of events as the event processor 110). Additionally, or alternatively, the computing instance 112 may transmit heartbeat messages 128-1 to the management system 126.

In some implementations, each event processor 110 includes or is associated with an event retrieval component 114. An event retrieval component 114 may retrieve events to be processed by a corresponding event processor 110. For example, the event retrieval component 114 may retrieve events having an event type that matches an event type processed by the event processor 110. In some implementations, the event retrieval component 114 may identify appropriate events for retrieval based on an event type tag associated with an event stored in an event store. Thus, an event processor 110 may be configured to select (e.g., using a corresponding event retrieval component 114 and/or a corresponding computing instance 112) which events to consume (e.g., retrieve) and/or which events to process. When the second data center 104 has not failed, the event retrieval component 114 may retrieve events only from the main event store 106. When the second data center 104 fails, the event retrieval component 114 may retrieve events from either the replica event store 108 or the main event store 116 based on a configuration and/or an instruction, as described in more detail elsewhere herein.

Similarly, the second data center 104 may include multiple event processors 120. An event processor 120 may be configured to process second events stored in the main event store 116. In some implementations, an event processor 120 may be configured to process second events having a particular event type (e.g., which may be indicated and/or stored in connection with the event, such as in the main event store 116). For example, an event processor 120 may include software code and hardware on which the software code executes. The software code may include instructions for processing an event of a particular event type. One event processor 120 may process events having a first event type, another event processor 120 may process events having a second event type, and so on.

In some implementations, each event processor 120 includes or is associated with a computing instance 122. The computing instance 122 may be used by an event processor 120 to transmit heartbeat messages 128-2 to the first data center 102. Additionally, or alternatively, the computing instance 122 may be used by the event processor 120 to receive and/or process heartbeat messages 128-1 from the first data center 102. In some implementations, a computing instance 122 of an event processor 120 may transmit heartbeat messages 128-2 to a corresponding computing instance 112 of a corresponding event processor 110 in the first data center 102 (e.g., an event processor 110 that processes the same type of events as the event processor 120). Additionally, or alternatively, the computing instance 122 may transmit heartbeat messages 128-2 to the management system 126.

In some implementations, each event processor 120 includes or is associated with an event retrieval component 124. An event retrieval component 124 may retrieve events to be processed by a corresponding event processor 120. For example, the event retrieval component 124 may retrieve events having an event type that matches an event type processed by the event processor 120. In some implementations, the event retrieval component 124 may identify appropriate events for retrieval based on an event type tag associated with an event stored in an event store. Thus, an event processor 120 may be configured to select (e.g., using a corresponding event retrieval component 124 and/or a corresponding computing instance 122) which events to consume (e.g., retrieve) and/or which events to process. When the first data center 102 has not failed, the event retrieval component 124 may retrieve events only from the main event store 116. When the first data center 102 fails, the event retrieval component 124 may retrieve events from either the replica event store 118 or the main event store 106 based on a configuration and/or an instruction, as described in more detail elsewhere herein.

The example system 100 has a system architecture that supports two-way failover, including both failover from the first data center 102 to the second data center 104 and failover from the second data center 104 to the first data center 102. However, in some implementations, systems described herein may support only one-way failover, such as only failover from the first data center 102 to the second data center 104 or only failover from the second data center 104 to the first data center 102. In an example where one-way failover from only the first data center 102 to the second data center 104 is supported, the first data center 102 may not include the replica event store 108, the event retrieval component 114 may retrieve events from only the main event store 106, and/or the computing instance 112 may only transmit (and not receive) heartbeat messages 128. Similarly, in an example where one-way failover from only the second data center 104 to the first data center 102 is supported, the second data center 104 may not include the replica event store 118, the event retrieval component 124 may retrieve events from only the main event store 116, and/or the computing instance 122 may only transmit (and not receive) heartbeat messages 128. Additionally, or alternatively, the system 100 may include more than two data centers that include the components described herein and operate according to the techniques described herein.

As shown by reference number 130, the system 100 (e.g., using the management system 126) may detect a failure of a second event processor 120. For example, a particular event processor 120, of the multiple event processors 120 included in the second data center 104, may fail. The failed event processor 120 may be configured to process a particular type of event (e.g., one of multiple event types for which the second event processors 120 are configured to process). The particular event processor 120 may fail due to a software error (e.g., a bug), a hardware error (e.g., a misconfiguration, a disk crash, or the like), a communication error (e.g., a failure to retrieve events from the main event store 116, a network error, or the like), a database error (e.g., corrupted data), and/or a power failure, among other examples. In some implementations, heartbeat messages 128 are transmitted to the management system 126, and the management system 126 may detect the failure based on failing to receive a heartbeat message 128. Alternatively, heartbeat messages 128 may be transmitted to event processors (e.g., to a computing instance), and an event processor may notify the management system 126 upon failure to receive a heartbeat message 128.

In some implementations, the system 100 may detect the failure of the second event processor 120 based on a failure to receive a heartbeat message 128-2 associated with the second event processor 120, based on reception of a heartbeat message 128-2 that indicates a failure status associated with the second event processor 120, and/or based on one or more metrics associated with the second event processor 120. As described above, each event processor 120 may include or may be associated with a computing instance 122 that is used to transmit heartbeat messages 128-2 to the first data center 102 (e.g., to a corresponding event processor 110 in the first data center 102 and/or to the management system 126). In some implementations, each event processor 120 may transmit independent heartbeat messages 128 to the first data center 102 (e.g., independent of other heartbeat messages 128 transmitted by other event processors 120). This enables customized configuration of heartbeat messages 128 for each event processor 120 and customized handling of heartbeat messages 128 by the first data center 102, as described in more detail below.

A heartbeat message 128 may indicate an event processor 120 with which the heartbeat message 128 is associated. In some implementations, the heartbeat message 128 may explicitly indicate the event processor 120, such as by including information that identifies the event processor 120 with which the heartbeat message 128 is associated. For example, the heartbeat message 128 may include an event processor identifier, such as an event processor filename, an event processor function name, or the like. In some implementations, a heartbeat message 128 may only include the event processor identifier (and not any other information). In this example, presence or absence of a heartbeat message 128 (e.g., successful or unsuccessful transmission and reception of the heartbeat message 128) may indicate a status of a corresponding event processor 120 (e.g., whether the event processor 120 is operating normally or is associated with a failure). In this example, the event processor 120 may refrain from transmitting the heartbeat message 128, or may attempt to transmit the heartbeat message 128 but experience a failure in the transmission, when the event processor 120 experiences a failure. This conserves network resources and reduces latency of transmission of heartbeat messages 128 due to a smaller message size.

In some implementations, the heartbeat message 128 may implicitly indicate the event processor 120 associated with the heartbeat message 128 (e.g., without including an event processor identifier). For example, the event processor 120 may be configured to transmit the heartbeat message 128 to a corresponding event processor 110 (e.g., to a particular network address associated with the corresponding event processor 110) that processes the same event types as the event processor 120. In this case, the management system 126 and/or the event processor 110 may determine the event processor 120 associated with the heartbeat message 128 based on the event processor 110 that received the heartbeat message 128. This may further conserve network resources and reduce latency of transmission of heartbeat messages 128 due to a smaller message size.

In some implementations, the heartbeat message 128 may explicitly indicate the status of a corresponding event processor 120 (e.g., using a field in the heartbeat message 128). For example, a first value (e.g., 1) of a bit may indicate that the corresponding event processor 120 is operating normally (e.g., a normal status), and a second value (e.g., 0) of a bit may indicate that the corresponding event processor 120 is associated with a failure (e.g., a failure status). In some implementations, the system 100 may detect a failure of the second event processor 120 if either a heartbeat message 128 is not received (e.g., for a threshold time or a threshold quantity of periods, as described elsewhere herein) or if a heartbeat message 128 that explicitly indicates a failure is received. This may improve robustness in failure detection as compared to using only one of these techniques.

In some implementations, each event processor 120 may periodically transmit corresponding heartbeat messages 128-1 according to a periodicity (e.g., every 10 milliseconds, every 100 milliseconds, every 1 second, every 5 seconds, and so on). The periodicity of transmission of heartbeat messages 128 associated with a particular event processor 120 may be indicated in a configuration associated with that event processor 120. In some implementations, different event processors 120 may be associated with different configurations, and may transmit corresponding heartbeat messages 128 according to different periodicities. This enables customization and prioritization based on a criticality of events being processed by a particular event processor 120. In some implementations, the system 100 (e.g., using the management system 126) may determine the periodicity for an event processor 120 (e.g., rather than the periodicity being input by an operator associated with the event processor 120), such as based on the quantity of events stored in the main event store 116 that have an event type to be processed by the event processor 120. For example, an event type for which a greater quantity of events is stored in the main event store 116 may be associated with a shorter periodicity than another event type for which a lesser quantity of events is stored in the main event store 116. This enables prioritization of more important event types, as indicated by the quantity of events of that event type. In some implementations, each event processor 120 may transmit heartbeat messages 128 with the same periodicity to reduce system complexity.

In some implementations, the management system 126 and/or the event processor 110 may detect the failure associated with the event processor 120 based on a heartbeat message 128 not being received for a threshold time and/or for a threshold quantity of periods. For example, if the first data center 102 does not receive any heartbeat messages associated with a particular event processor 120 for a threshold amount of time (e.g., 10 milliseconds, 100 milliseconds, 1 second, 5 seconds, or the like), then the first data center 102 (e.g., a corresponding event processor 110 and/or the management system 126) may determine that the particular event processor 120 is associated with a failure. As another example, if the first data center 102 does not receive any heartbeat messages associated with a particular event processor 120 for a threshold quantity of periods (e.g., 1 period, 2 periods, 3 periods, or the like), then the first data center 102 (e.g., a corresponding event processor 110 and/or the management system 126) may determine that the particular event processor 120 is associated with a failure. The duration of a period to be used for an event processor 120 may be determined based on (or equal to) the periodicity associated with that event processor 120.

In some implementations, the threshold time and/or the threshold quantity of periods for a particular event processor 120 may be indicated in a configuration associated with that event processor 120. In some implementations, different event processors 120 may be associated with different threshold times and/or threshold quantities of periods. This enables customization and prioritization based on a criticality of events being processed by a particular event processor 120. In some implementations, the system 100 (e.g., using the management system 126) may determine the threshold time and/or the threshold quantity of periods for an event processor 120 (e.g., rather than those values being input by an operator associated with the event processor 120), such as based on the quantity of events stored in the main event store 116 that have an event type to be processed by the event processor 120. For example, an event type for which a greater quantity of events is stored in the main event store 116 may be associated with a shorter threshold time and/or a smaller quantity of periods than another event type for which a lesser quantity of events is stored in the main event store 116. This enables prioritization of, and faster failover for, more important event types, as indicated by the quantity of events of that event type. In some implementations, each event processor 120 may be associated with the same threshold time and/or the same threshold quantity of periods to reduce system complexity.

In some implementations, the management system 126 may detect the failure associated with the event processor 120 based on one or more metrics (e.g., one or more data center metrics) associated with the event processor 120. A metric may indicate an operational status and/or performance of a data center (e.g., the second data center 104 in system 100), an event store (e.g., the main event store 116 in system 100), and/or an event processor (e.g., an event processor 120 in system 100). For example, a metric associated with an event processor 120 may indicate a processor utilization of the event processor 120 (e.g., central processing unit (CPU) utilization), a memory utilization of the event processor 120, a rate at which the event processor 120 is processing events, network traffic associated with the event processor 120 and/or the second data center 104 (e.g., a volume or rate of network traffic into or out of the second data center 104), and/or whether the event processor 120 is actively processing events, among other examples. As shown, the metrics may be used by a computing instance (e.g., the computing instance 112 and/or the computing instance 122) and/or the management system 126 to detect a failure. In some implementations, the metrics may be stored in a metrics database accessible by a computing instance and/or the management system 126. For example, the first data center 102 may include a first metrics database, and the second data center 104 may include a second metrics database.

In some implementations, the management system 126 may detect the failure associated with the event processor 120 if the processor utilization satisfies a threshold, if the memory utilization satisfies a threshold, if the rate at which the event processor 120 is processing events fails to satisfy a threshold, if the network traffic satisfies a threshold, and/or if the event processor 120 is not actively processing events, among other examples. In a similar manner as described elsewhere herein, one or more of these thresholds, for a particular event processor 120, may be indicated in a configuration associated with that event processor 120 (e.g., based on operator input or a determination by the management system 126 based on a quantity of events of a particular event type stored in the main event store 116).

In some implementations, based on detecting the failure associated with the event processor 120, the management system 126 may transmit a notification to one or more event producers (not shown), instructing the one or more event producers (e.g., one or more event sources) to produce events for the first data center 102. For example, a first set of event producers may produce events for the first data center 102 (e.g., to populate the main event store 106 with first events), and a second set of event producers may produce events for the second data center 104 (e.g., to populate the main event store 116 with second events). Based on detecting the failure associated with the second data center 104 (e.g., the event processor 120), the management system 126 may notify the second set of event producers to begin producing events to the first data center 102 (e.g., to populate the main event store 106). Additionally, or alternatively, the second set of event producers may autonomously being producing events to the first data center 102 (e.g., without a notification or instruction from the messaging system 126) based on detecting a failure in the second data center and/or a threshold quantity of failed attempts to produce an event to the second data center 104.

As shown by reference number 132, the system 100 (e.g., using the management system 126) may identify an event processor 110, in the first data center 102, that is to process one or more second events (e.g., associated with the failed event processor 120). For example, the management system 126 may identify the event processor 110 after detecting the failure of the event processor 120. The identified event processor 110 may be configured to process the same type of events as the failed event processor 120 (e.g., the identified event processor 110 may include code that is also included in the failed event processor 120). In some implementations, the management system 126 may identify an event processor 110 corresponding to the failed event processor 120 based on an event processor identifier associated with the failed event processor 120. For example, the management system 126 may identify an event processor 110 having the same event processor identifier as the failed event processor 120. As another example, the management system 126 may store a data structure (e.g., a table) that indicates a mapping between event processors 110 in the first data center 102 and corresponding event processors 120 in the second data center 104. The management system 126 may use this data structure to look up (e.g., using an event processor identifier of the failed event processor 120) an event processor 110 corresponding to the failed event processor 120.

In some implementations, a configuration associated with the failed event processor 120 may indicate whether a corresponding event processor 110 is to be booted up or is to be selected from multiple event processors 110 that are actively processing first events in the first data center 102. This enables flexible configuration of different event processors. In the example of FIG. 1, the management system 126 selects the event processor 110 from multiple event processors 110 that are actively processing first events in the first data center 102 (e.g., first events stored in the main event store 106). In this example, the identified event processor 110 and the failed event processor 120 may be configured for identical processing of events based on execution of identical code, which enables use of an event processor 110 that is already actively processing events having the same event type as events that the failed event processor 120 is configured to process (e.g., because the event processor 110 will execute the same code for first events and second events having the same event type). In other examples, described in more detail below in connection with FIG. 2 and FIG. 3, the management system 126 may boot up an event processor 110 to process the one or more second events.

In some implementations, the management system 126 may determine whether to boot up or select the event processor 110 based on the quantity of events stored in the main event store 116 that have an event type to be processed by the event processor 110 (e.g., the same event type of events processed by the failed event processor 120). For example, the management system 126 may boot up an event processor 110 to process second events having an event type for which a quantity of events stored in the main event store 116 (or the replica event store 108) satisfies a threshold, and may select an active event processor 110 (e.g., that processes the same type of events processed by the failed event processor 120) to process second events having an event type for which a quantity of events stored in the main event store 116 (or the replica event store 108) does not satisfy the threshold. Additionally, or alternatively, the management system 126 may boot up an event processor 110 if a sum of first events and second events having the event type to be processed satisfies a threshold, and may select an active event processor 110 if a sum of first events and second events having the event type to be processed does not satisfy the threshold. This enables customization and prioritization based on a criticality and/or volume of events that are being failed over to the first data center 102.

In some implementations, the management system 126 may determine whether an event processor 110, corresponding to the failed event processor 120, is already booted up. If the corresponding event processor 110 is booted up in the first data center 102 (e.g., as shown in FIG. 1), then the management system 126 may select that event processor 110 to process second events for the failed event processor 120, and may instruct that event processor 110 to process the second events. If the corresponding event processor 110 is not booted up in the first data center 102, then the management system 126 may boot up that event processor 110 prior to instructing that event processor 110 to process the second events, as described in more detail below in connection with FIG. 2 and FIG. 3.

As shown by reference number 134, the management system 126 may identify a configuration associated with the failed event processor 120 and/or the identified event processor 110. For example, the management system 126 may store a data structure that identifies event processors 110 and/or event processors 120 and corresponding configurations for those event processors. In some implementations, the data structure may indicate a correspondence between an event processor 110 and an event processor 120 (e.g., using one or more event processor identifiers), and may also indicate a configuration to be used for those event processors 110, 120 (e.g., a single configuration for both event processors 110, 120 or different configurations for each event processor 110, 120). As described above, the configuration may indicate a periodicity for heartbeat messages, a failure detection condition (e.g., a threshold time for detecting failure, a threshold quantity of periods for detecting failure, one or more metric thresholds), and/or whether to boot up or select an event processor upon detecting a failure.

Additionally, or alternatively, the configuration may indicate whether the identified event processor 110 is to process the one or more second events from the replica event store 108 in the first data center 102 or the main event store 116 of the second data center 104. Retrieval and processing of events from the replica event store 108 may have lower latency than retrieval and processing of events from the main event store 116 because the replica event store 108 is located nearer to the event processor 110. However, retrieval and processing of events from the main event store 116 may result in more accurate processing (e.g., less duplicate processing of events that have already been processed in the second data center 104, more accuracy in the stored events that are to be processed, or the like) due to synchronization issues between the main event store 116 and the replica event store 108. In some implementations, different event processors 110 may be associated with different configurations depending on whether latency or accuracy (and/or other factors) are to be prioritized.

In some implementations, the management system 126 may determine whether the identified event processor 110 is to process the one or more second events from the replica event store 108 or the main event store 116 (e.g., rather than this configuration being input by an operator associated with the event processor 110), such as based on the quantity of events stored in the main event store 116 and/or the replica event store 108 that have an event type to be processed by the identified event processor 110. For example, the management system 126 may instruct the event processor 110 (e.g., the event retrieval component 114) to process second events from the main event store 116 if the second events have an event type for which a quantity of events stored in the main event store 116 (and/or the replica event store 108) satisfies a threshold, and may instruct the event processor 110 (e.g., the event retrieval component 114) to process second events from the replica event store 108 if the second events have an event type for which a quantity of events stored in the main event store 116 (and/or the replica event store 108) does not satisfy the threshold. This enables more accurate event processing for more important event types, as indicated by the quantity of events of that event type.

In some implementations, the management system 126 may determine whether the identified event processor 110 is to process the one or more second events from the replica event store 108 or the main event store 116 based on applying a trained machine learning model. For example, the management system 126 may train a machine learning model based on a set of observations that indicate one or more conditions that triggered a failure, an event type to be failed over, whether events were retrieved from the replica event store 108 or the main event store 116 after the failure, and/or a success rate of processing failed-over events. The one or more conditions may include, for example, a condition that caused the management system 126 to detect the failure and trigger failover, one or more metrics at the time of the failure, whether the failure was triggered based on a heartbeat message or a metric, and/or one or more thresholds associated with the failure (e.g., as described above). The success rate of processing failed-over events may indicate the percentage, ratio, or another indicator of success for a quantity of failed-over events that were successfully processed (e.g., out of a total quantity of failed-over events where processing was attempted, or compared to a quantity of failed-over events that were not successfully processed by the event processor 110).

For example, the management system 126 may train the machine learning model based on a set of historical inputs that indicate one or more conditions, an event type to be failed over, and/or whether events were retrieved from a main event store or a replica event store, as well as a corresponding success rate associated with those historical inputs. Then, when the management system 126 detects a failure, the management system 126 may input one or more current conditions (e.g., at the time of detecting the failure) and an event type associated with the failure. The trained machine learning model may use these inputs to predict a first success rate associated with event retrieval of the failed event type from the main event store 116 and to predict a second success rate associated with event retrieval of the failed event type from the replica event store 108. The management system 126 may compare the success rates, and may select the retrieval option (e.g., the main event store 116 or the replica event store 108) associated with the higher success rate.

As shown by reference number 136, the management system 136 may transmit an instruction, to the identified event processor 110 (e.g., to an event retrieval component 114 of the identified event processor 110), instructing the identified event processor 110 to process second events from one of the main event store 116 or the replica event store 108. By transmitting this instruction, the management system 136 may cause retrieval of one or more second events from one of the replica event store 108 or the main event store 116 for processing by the first event processor.

For example, as shown by reference number 138, based on the instruction, the identified event processor 110 (e.g., using the retrieval component 114) may retrieve second events from one of the main event store 116 or the replica event store 108. For example, if the instruction indicates to retrieve second events from the main event store 116, then the event processor 110 may retrieve second events, having an event type associated with the event processor 110 (e.g., which may be indicated by a tag or another indication stored in the main event store 116), from the main event store 116. As another example, if the instruction indicates to retrieve second events from the replica event store 108, then the event processor 110 may retrieve second events, having an event type associated with the event processor 110 (e.g., which may be indicated by a tag or another indication stored in the replica event store 108), from the replica event store 108.

In some implementations, the management system 126 may determine that the identified event processor 110 is to attempt to retrieve one or more second events from the main event store 116 and is then to retrieve the one or more second events from the replica event store 108 only if attempted retrieval of the one or more second events from the main event store 116 fails. In some implementations, this may be a default configuration to be followed if there is no stored configuration that specifically indicates that second events are to be retrieved from one of the main event store 116 or the replica event store 108. In this case, the management system 126 may instruct the identified event processor 110 to first attempt to access the main event store 116 and then access the replica event store 108 if access to the main event store 116 fails. The event processor 110 (e.g., using the event retrieval component) may attempt to retrieve one or more second events from the main event store 116 based on this instruction. If the event processor 110 determines that this attempt has failed, then the event processor 110 may retrieve the one or more second events from the replica event store 108. This may enable more robust failover than attempting to retrieve events from only one event store.

As shown by reference number 140, the identified event processor 110 may process the one or more second events that have been retrieved. After processing a second event, the event processor 110 may update a record of the second event stored in the event store from which the second event was retrieved (e.g., one of the replica event store 108 or the main event store 116), which may cause the other event store to be updated due to database synchronization or mirroring. In this way, duplicate processing of events may be avoided (e.g., when the failure of the failed event processor 120 is resolved).

In some implementations, the system 100 (e.g., the event processor 110 that is processing second events or the management system 126) may determine that the failure, associated with the corresponding second event processor 120, has been resolved. For example, the event processor 110 and/or the management system 126 may receive a heartbeat message from the event processor 120, may receive a heartbeat message that indicates that the event processor 120 is in a normal status, and/or may determine that one or more metrics indicate that the failure has been resolved for the event processor 120. Based on the determination that the failure has been resolved, the event processor 110 may refrain from processing any additional second events (e.g., that have not yet been processed) that otherwise would have been processed by the event processor 110. In some implementations, if the management system 126 determines that the failure has been resolved, then the management system 126 may instruct the identified event processor 110 to refrain from processing additional second events. In this case, the event processor 110 may continue to process first events from the main event store 106.

The techniques described above may be used for failover in the system 100 (e.g., an event processing system having an event-driven architecture) to improve service availability, reduce delays associated with event processing, and/or prevent data loss.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1. For example, a computing instance may perform operations described herein as being performed by the management system 126, or vice versa.

Figure 2:
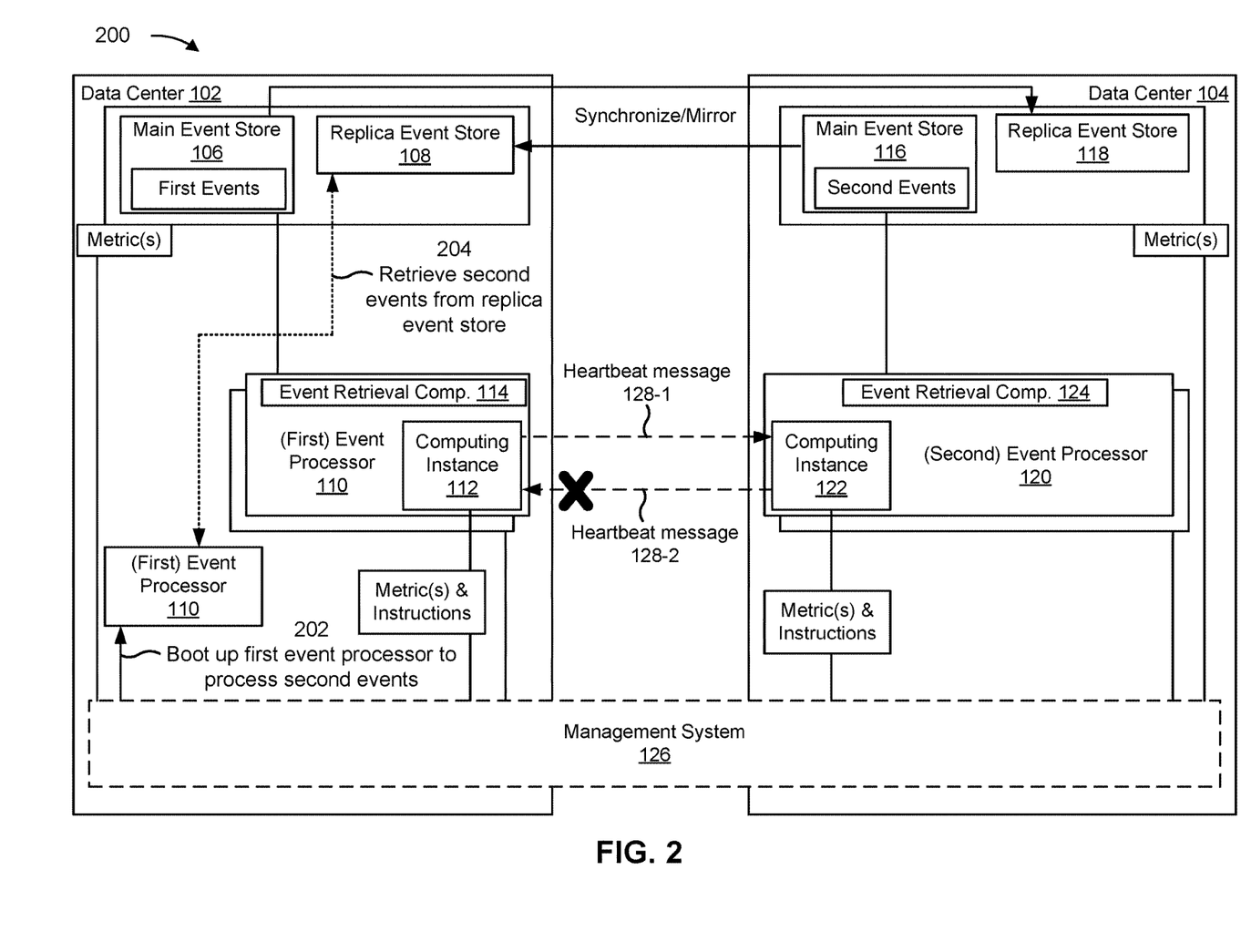

FIG. 2 is a diagram of an example system 200 associated with event-driven system failover and failback. The system 200 shown in FIG. 2 is the same as the system 100 shown in FIG. 1. FIG. 2 shows an example of the management system 126 booting up an event processor 110 to process second events from the second data center 104 after detecting a failure associated with a corresponding event processor 120 in the second data center 104. FIG. 2 further shows event retrieval from the replica event store 108.

For example, the system 200 (e.g., the management system 126 and/or one or more other components of the first data center 102) may detect a failure of an event processor 120 and may identify a corresponding event processor 110 to process second events that would have otherwise been processed by the failed event processor 120 (e.g., events having an event type that the failed event processor 120 is configured to process), as described above in connection with FIG. 1.

As shown by reference number 202, the management system 126 may boot up an identified event processor 110 to process one or more second events (e.g., after identifying the event processor 110, as described above in connection with FIG. 1). For example, the management system 126 may boot up the identified event processor 110 if a configuration associated with the identified event processor 110 and/or the failed event processor 120 indicates that the identified event processor 110 is to be booted up (e.g., rather than selected from a group of event processors 110 that are already booted up), as described above in connection with FIG. 1. Additionally, or alternatively, the management system 126 may boot up the identified event processor 110 based on a quantity of events stored in the main event store 116 that have an event type to be processed by the identified event processor 110, as described above in connection with FIG. 1. Additionally, or alternatively, the management system 126 may boot up the identified event processor 110 based on a sum of quantities of first events and second events having the event type to be processed by the identified event processor 110, as described above in connection with FIG. 1.

In some implementations, the management system 126 may determine whether an event processor 110, corresponding to the failed event processor 120, is already booted up. If the corresponding event processor 110 is not booted up in the first data center 102, then the management system 126 may boot up that event processor 110. The management system 126 may then instruct the event processor 110 to process the second events, such as based on a configuration and/or by transmitting a retrieval instruction, as described above in connection with FIG. 1.

In FIG. 2, the management system 126 instructs the booted up event processor 110 (e.g., an event retrieval component 114 of the booted up event processor 110) to retrieve one or more second events from the replica event store 108, as shown by reference number 204. Based on this instruction, the booted up event processor 110 retrieves the one or more second events from the replica event store 108, as described above in connection with FIG. 1. The booted up event processor 110 may process the one or more second events as described above in connection with FIG. 1, and may stop processing events when a failure is resolved, as also described above in connection with FIG. 1.

When the management system 126 boots up an event processor 110 rather than selecting from an active event processor 110 that is already booted up and/or is already processing first events, the booted up event processor 110 and the failed event processor 120 may be configured for different processing of events based on execution of different code (e.g., rather than identical processing of events based on execution of identical code, as described above in connection with FIG. 1). In this case, the booted up event processor 110 may include additional code that flags one or more second events, processed by the booted up event processor 110, in the event store from which the one or more second events are retrieved (e.g., the replica event store 108 and/or the main event store 116). For example, the one or more second events may be flagged in the event store as having been processed by the identified event processor 110 or in the first data center 102 rather than by the failed event processor 120 or in the second data center 104. This flagging or marking enables these events to be reviewed.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
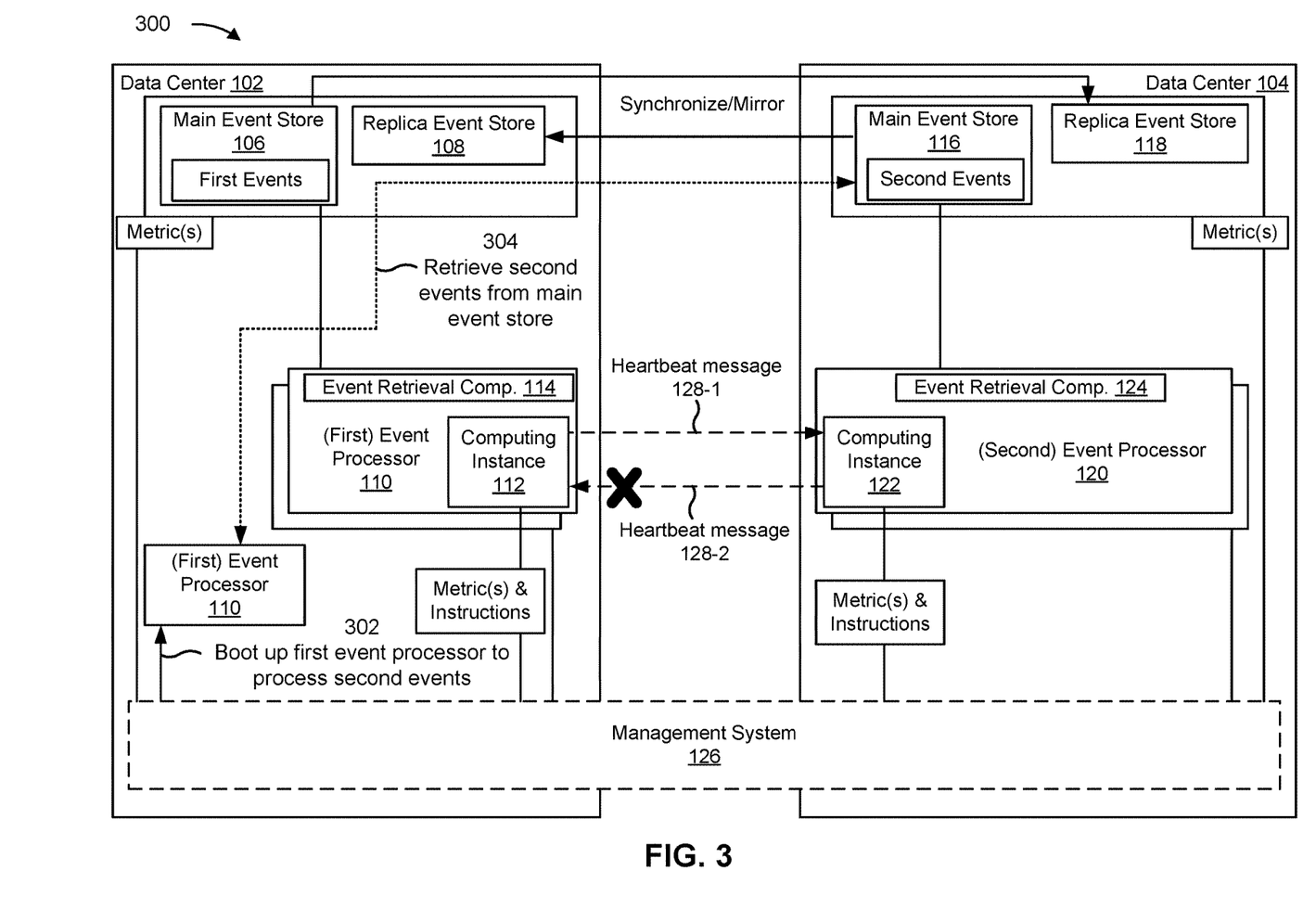

FIG. 3 is a diagram of an example system 300 associated with event-driven system failover and failback. The system 300 shown in FIG. 3 is the same as the system 100 shown in FIG. 1 and the system 200 shown in FIG. 2. FIG. 3 shows an example of the management system 126 booting up an event processor 110 to process second events from the second data center 104 after detecting a failure associated with a corresponding event processor 120 in the second data center 104. FIG. 3 further shows event retrieval from the main event store 116.

For example, the system 300 (e.g., the management system 126 and/or one or more other components of the first data center 102) may detect a failure of an event processor 120 and may identify a corresponding event processor 110 to process second events that would have otherwise been processed by the failed event processor 120 (e.g., events having an event type that the failed event processor 120 is configured to process), as described above in connection with FIG. 1.

As shown by reference number 302, the management system 126 may boot up an identified event processor 110 to process one or more second events (e.g., after identifying the event processor 110, as described above in connection with FIG. 1), as described above in connection with FIG. 1 and FIG. 2. In FIG. 3, the management system 126 instructs the booted up event processor 110 (e.g., an event retrieval component 114 of the booted up event processor 110) to retrieve one or more second events from the main event store 116, as shown by reference number 304. Based on this instruction, the booted up event processor 110 retrieves the one or more second events from the main event store 116, as described above in connection with FIG. 1. The booted up event processor 110 may process the one or more second events as described above in connection with FIG. 1, and may stop processing events when a failure is resolved, as also described above in connection with FIG. 1.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
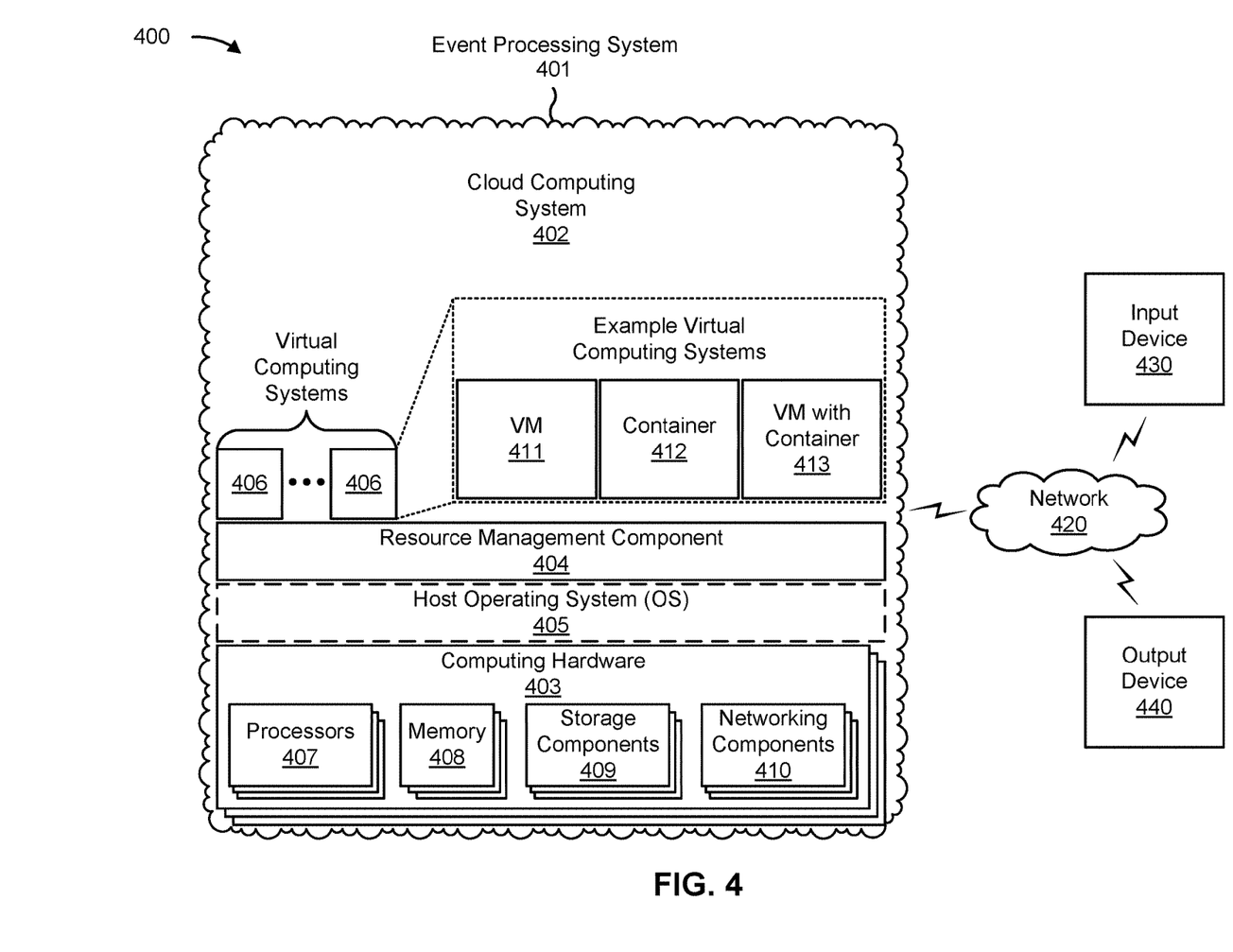
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an event processing system 401, which may include one or more elements of and/or may execute within a cloud computing system 402. The cloud computing system 402 may include one or more elements 403-413, as described in more detail below. As further shown in FIG. 4, environment 400 may include a network 420, an input device 430, and/or an output device 440. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409 (e.g., one or more hard disk drives), and/or one or more networking components 410. Examples of a processor, a memory, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, or a hybrid environment 413 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the event processing system 401 may include one or more elements 403-413 of the cloud computing system 402, may execute within the cloud computing system 402, and/or may be hosted within the cloud computing system 402, in some implementations, the event processing system 401 may not be cloud-based (e.g., may be implemented outside of a cloud computing system) or may be partially cloud-based. For example, the event processing system 401 may include one or more devices that are not part of the cloud computing system 402, such as device 500 of FIG. 5, which may include a standalone server or another type of computing device. The event processing system 401 may perform one or more operations and/or processes described in more detail elsewhere herein.

In some implementations, the system 100 of FIG. 1, the system 200 of FIG. 2, and/or the system 300 of FIG. 3 may be or may include one or more elements of the event processing system 401 of FIG. 4. In some implementations, the first data center 102 may be or may include a first event processing system 401, and the second data center 104 may be or may include a second event processing system 401. As another example, the event processors 110, 120 may include computing hardware 403, a resource management component 404, a host operating system 405, and/or a virtual computing system 406. Additionally, or alternatively, the main event stores 106, 116 and/or the replica event stores 108, 118 may include memory 408 and/or storage components 409. Additionally, or alternatively, the management system 126 may include computing hardware 403, a resource management component 404, and/or a host operating system 405.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The input device 430 includes one or more devices that are an event source, an event producer, or a data source for events to be processed by the event processing system 401, the system 100, the system 200, and/or the system 300, and may transmit events (or event notifications) to one or more of these systems. The input device 430 may include a communication device and/or a computing device. For example, the input device 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The output device 440 includes one or more devices that are event consumers for events processed by the event processing system 401, the system 100, the system 200, and/or the system 300. The output device 440 may receive instructions to perform one or more actions based on the processing of events by one or more of these systems (e.g., by one or more event processors). The output device 440 may perform such actions, such as triggering alerts, triggering workflows, or performing some other automated action or processing. The output device 440 may include a communication device and/or a computing device. For example, the output device 440 may include a server, such as an application server, a client server, a web server, a database server, a host server, a proxy server, a virtual server (e.g., executing on computing hardware), or a server in a cloud computing system.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
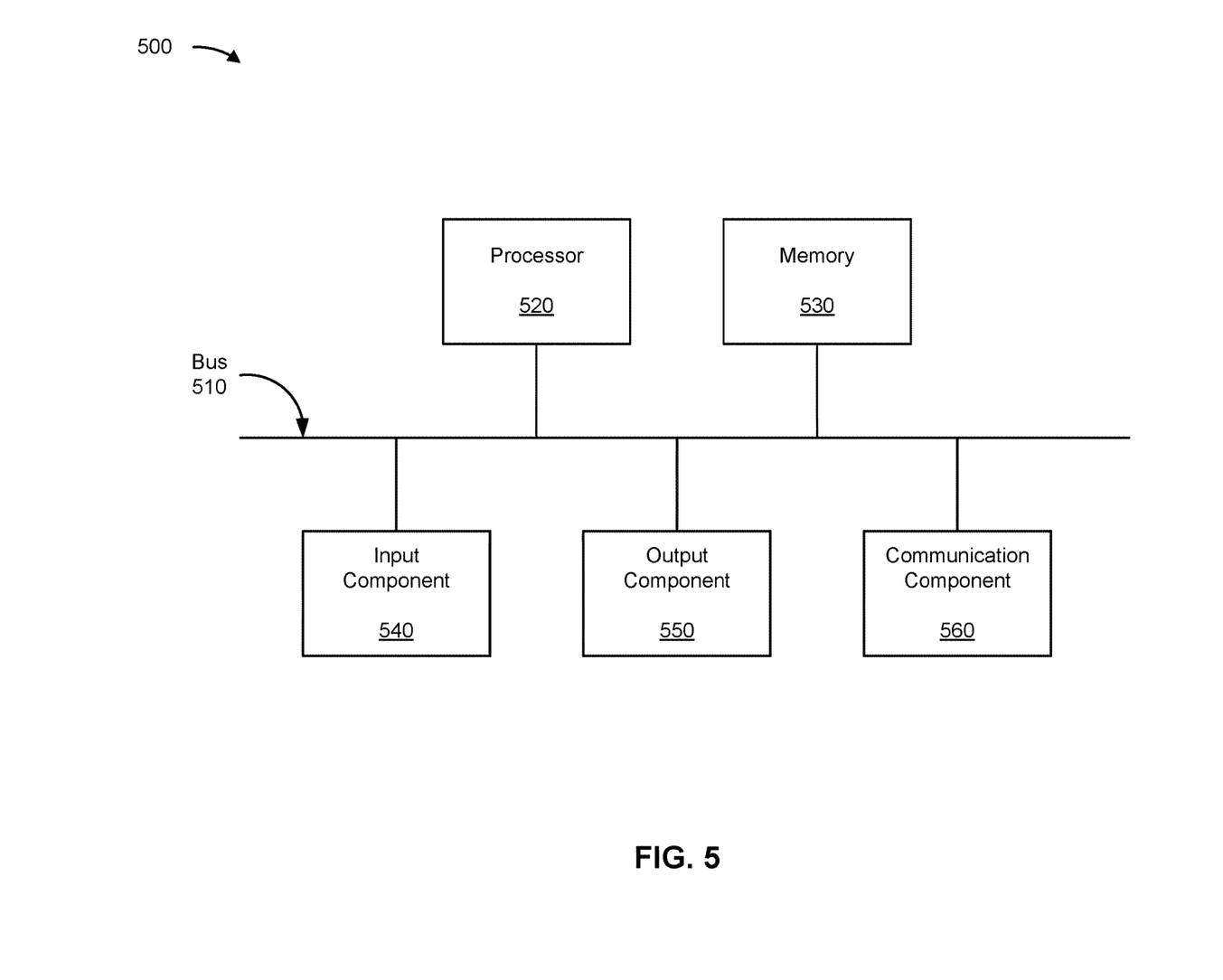
FIG. 5 is a diagram of example components of one or more devices of FIG. 4.

FIG. 5 is a diagram of example components of a device 500, which may correspond to main event store 106, replica event store 108, event processor 110, main event store 116, replica event store 118, event processor 120, management system 126, event processing system 401, input device 430, and/or output device 440. In some implementations, main event store 106, replica event store 108, event processor 110, main event store 116, replica event store 118, event processor 120, management system 126, event processing system 401, input device 430, and/or output device 440 may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
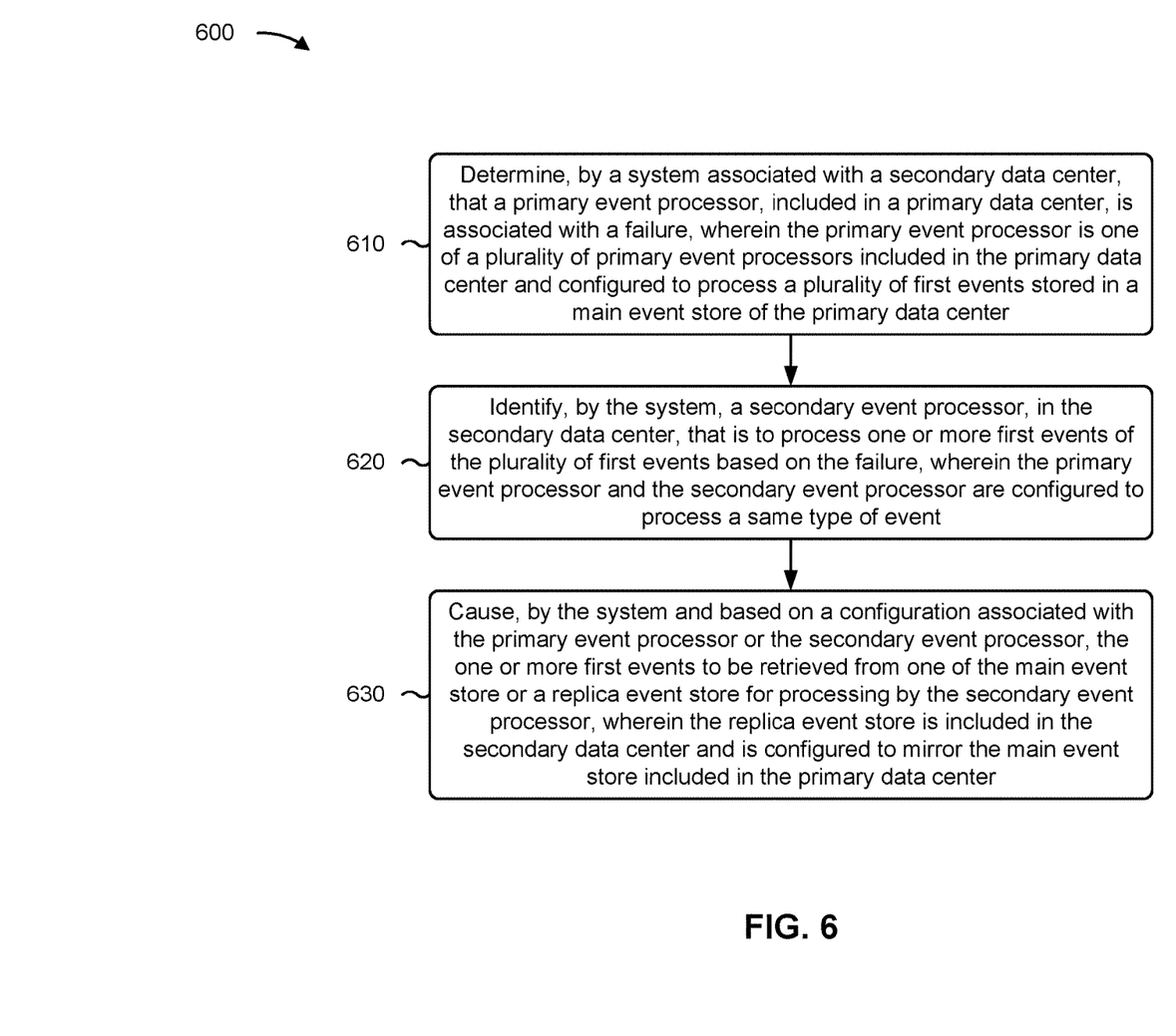
FIG. 6 is a flowchart of an example process relating to event-driven system failover and failback.

FIG. 6 is a flowchart of an example process 600 associated with event-driven system failover and failback. In some implementations, one or more process blocks of FIG. 6 may be performed by a system (e.g., system 100, system 200, system 300, and/or event processing system 401). In some implementations, one or more process blocks of FIG. 6 may be performed by another device or a group of devices separate from or including the system. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include determining that a primary event processor, included in the primary data center, is associated with a failure, wherein the primary event processor is one of a plurality of primary event processors included in the primary data center and configured to process a plurality of first events stored in a main event store of the primary data center (block 610). As further shown in FIG. 6, process 600 may include identifying a secondary event processor, in the secondary data center, that is to process one or more first events of the plurality of first events based on the failure, wherein the primary event processor and the secondary event processor are configured to process a same type of event (block 620). As further shown in FIG. 6, process 600 may include causing, based on a configuration associated with the primary event processor or the secondary event processor, the one or more first events to be retrieved from one of the main event store or a replica event store for processing by the secondary event processor, wherein the replica event store is included in the secondary data center and is configured to mirror the main event store included in the primary data center (block 630).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data center failover, comprising:
   a first data center that includes:
   a first main event store that stores a plurality of first events to be processed in the first data center;
   a first replica event store that is synchronized with a second main event store of a second data center; and
   a plurality of first event processors configured to process the plurality of first events stored in the first main event store;
   the second data center, wherein the second data center includes:
   the second main event store, wherein the second main event store stores a plurality of second events to be processed in the second data center; and
   a plurality of second event processors configured to process the plurality of second events stored in the second main event store; and
   one or more processors configured to:
   detect a failure of a second event processor of the plurality of second event processors;
   identify a first event processor, in the first data center, that is to process one or more second events of the plurality of second events based on detecting the failure of the second event processor;
   determine, based on a configuration associated with the first event processor or the second event processor, whether the first event processor is to process the one or more second events from the first replica event store or the second main event store; and
   cause retrieval of the one or more second events from one of the first replica event store or the second main event store, for processing by the first event processor, based on determining whether the first event processor is to process the one or more second events from the first replica event store or the second main event store.

2. The system of claim 1, wherein the first event processor and the second event processor are configured to process a same type of event.

3. The system of claim 1, wherein the one or more processors are further configured to determine whether the configuration indicates that the first event processor is to be booted up or is to be identified from the plurality of first event processors.

4. The system of claim 1, wherein the one or more processors are further configured to:
   determine that the first event processor is booted up in the first data center based on identifying the first event processor; and
   instruct the first event processor to process the one or more second events based on determining that the first event processor is booted up in the first data center.

5. The system of claim 1, wherein the one or more processors are further configured to:
   determine that the first event processor is not booted up in the first data center based on identifying the first event processor;
   boot up the first event processor in the first data center based on determining that the first event processor is not booted up; and
   instruct the first event processor to process the one or more second events based on booting up the first event processor.

6. The system of claim 1, wherein the one or more processors, to determine whether the first event processor is to process the one or more second events from the first replica event store or the second main event store, are configured to:

determine, based on the configuration, that the first event processor is to attempt to retrieve the one or more second events from the second main event store and is then to retrieve the one or more second events from the first replica event store only if attempted retrieval of the one or more second events from the second main event store fails; and wherein the one or more processors, to cause retrieval of the one or more second events from one of the first replica event store or the second main event store, are configured to:

determine that an attempt to retrieve the one or more second events from the second main event store has failed; and cause retrieval of the one or more second events from the first replica event store based on determining that the attempt to retrieve the one or more second events from the second main event store has failed.

7. The system of claim 1, wherein the one or more processors are further configured to:

determine that the failure has been resolved; and refrain from processing any additional second events, of the plurality of second events, by the first event processor based on determining that the failure has been resolved.

8. The system of claim 1, wherein the one or more processors, to detect the failure of the second event processor, are configured to detect the failure based on at least one of:

failure to receive a heartbeat message associated with the second event processor;

reception of a heartbeat message, associated with the second event processor, that indicates a failure status; or a metric associated with the second event processor.

9. A method for data center failover between a primary data center and a secondary data center, comprising:

determining, by a system associated with the secondary data center, that a primary event processor, included in the primary data center, is associated with a failure, wherein the primary event processor is one of a plurality of primary event processors included in the primary data center and configured to process a plurality of first events stored in a main event store of the primary data center;

identifying, by the system, a secondary event processor, in the secondary data center, that is to process one or more first events of the plurality of first events based on the failure, wherein the primary event processor and the secondary event processor are configured to process a same type of event; and causing, by the system and based on a configuration associated with the primary event processor or the secondary event processor, the one or more first events to be retrieved from one of the main event store or a replica event store for processing by the secondary event processor, wherein the replica event store is included in the secondary data center and is configured to mirror the main event store included in the primary data center.

10. The method of claim 9, wherein determining that the primary event processor is associated with the failure comprises determining that a heartbeat message, associated with the primary event processor, was not received in the secondary data center.

11. The method of claim 10, wherein a periodicity of transmission of heartbeat messages, associated with the primary event processor, is based on the configuration.

12. The method of claim 9, wherein each of the plurality of primary event processors is configured to periodically transmit an independent heartbeat message to the secondary data center, and wherein each independent heartbeat message indicates a status of a corresponding primary event processor.

13. The method of claim 12, wherein each independent heartbeat message includes an identifier that identifies the corresponding primary event processor to which that independent heartbeat message corresponds.

14. The method of claim 9, wherein determining that the primary event processor is associated with the failure comprises determining that a heartbeat message, that includes an identifier for the primary event processor, has not been received in the secondary data center for a threshold time or for a threshold quantity of periods.

15. The method of claim 14, wherein the threshold time or the threshold quantity of periods is determined based on the configuration.

16. The method of claim 9, wherein determining that the primary event processor is associated with the failure comprises determining that a metric indicates that the primary event processor is associated with the failure, wherein the metric indicates at least one of:

processor utilization associated with the primary event processor, memory utilization associated with the primary event processor, whether the primary event processor is processing events, a rate at which the primary event processor is processing events, or network traffic associated with the primary data center.

17. A device for managing data center failover between a primary data center and a secondary data center, comprising:

one or more memories; and one or more processors, communicatively coupled to the one or more memories, configured to:

determine that a primary event processor, of a plurality of primary event processors included in the primary data center, is associated with a failure, wherein the plurality of primary event processors are configured to process a plurality of first events stored in a first main event store of the primary data center;

identify, based on the failure, a secondary event processor, of a plurality of secondary event processors included in the secondary data center, that is to process one or more first events of the plurality of first events, wherein the plurality of secondary event processors are configured to process a plurality of second events stored in a second main event store of the secondary data center;

identify a configuration associated with the primary event processor or the secondary event processor; and transmit an instruction to cause retrieval of the one or more first events, for processing by the secondary event processor, from one of the first main event store or a replica event store based on the configuration, wherein the replica event store is included in the secondary data center and is configured to mirror the first main event store included in the primary data center.

18. The device of claim 17, wherein the primary event processor and the secondary event processor are configured for identical processing of events based on execution of identical code.

19. The device of claim 17, wherein the primary event processor and the secondary event processor are configured for different processing of events based on execution of different code.

20. The device of claim 17, wherein processing of the one or more first events by the secondary event processor includes flagging the one or more first events as having been processed by the secondary event processor or in the secondary data center rather than by the primary event processor or in the primary data center.

* * * * *